United States Patent
Trundle et al.

(10) Patent No.: US 11,017,680 B2
(45) Date of Patent: May 25, 2021

(54) DRONE DETECTION SYSTEMS

(71) Applicant: Alarm.com Incorporated, Tysons, VA (US)

(72) Inventors: Stephen Scott Trundle, Falls Church, VA (US); Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/282,216

(22) Filed: Sep. 30, 2016

(65) Prior Publication Data

US 2017/0092138 A1 Mar. 30, 2017

Related U.S. Application Data

(60) Provisional application No. 62/235,042, filed on Sep. 30, 2015.

(51) Int. Cl.
*G08G 5/00* (2006.01)
*G08B 25/08* (2006.01)
(Continued)

(52) U.S. Cl.
CPC ......... *G08G 5/0082* (2013.01); *B64C 39/024* (2013.01); *F41H 11/00* (2013.01);
(Continued)

(58) Field of Classification Search
None
See application file for complete search history.

(56) References Cited

U.S. PATENT DOCUMENTS

| 8,854,465 B1 | 10/2014 | McIntyre |
| 9,087,451 B1 | 7/2015 | Jarrell |

(Continued)

FOREIGN PATENT DOCUMENTS

| DE | 102007062603 | 7/2009 |
| WO | WO2017042403 | 3/2017 |
| WO | WO2017139001 | 8/2017 |

OTHER PUBLICATIONS

Truong K.N., Patel S.N., Summet J.W., Abowd G.D.; "Preventing Camera Recording by Designing a Capture-Resistant Environment"; 2005; Ubiquitous Computing; Lecture Notes in Computer Science, vol. 3660. p. 73-86; https://link.springer.com/chapter/10.1007/11551201_5 (Year: 2005).*

(Continued)

*Primary Examiner* — David P. Merlino
(74) *Attorney, Agent, or Firm* — Fish & Richardson P.C.

(57) ABSTRACT

Methods, systems, and apparatus, including computer programs encoded on storage devices, for drone-augmented emergency response services. In one aspect, a device includes a network interface, one or more sensors, one or more processors, and one or more storage devices that include instructions that are operable to perform operations. The operations include monitoring a predetermined geographic area that surrounds a particular property, determining that a drone device is within the predetermined geographic area that surrounds the particular property, determining whether the drone device that is detected within the predetermined geographic area that surrounds the property is an unauthorized drone device, and in response to determining that the drone device that is detected within the predetermined geographic area that surrounds the property is an unauthorized drone device, transmitting a signal indicat- (Continued)

ing the detection of the unauthorized drone device within the predetermined geographic area that surrounds the property.

18 Claims, 5 Drawing Sheets

(51) Int. Cl.
| | |
|---|---|
| *G08B 13/196* | (2006.01) |
| *F41H 11/00* | (2006.01) |
| *H04K 3/00* | (2006.01) |
| *B64C 39/02* | (2006.01) |
| *G08B 25/14* | (2006.01) |
| *H04W 4/021* | (2018.01) |

(52) U.S. Cl.
CPC ..... *G08B 13/196* (2013.01); *G08B 13/19695* (2013.01); *G08B 25/08* (2013.01); *G08B 25/14* (2013.01); *G08G 5/006* (2013.01); *G08G 5/0013* (2013.01); *G08G 5/0026* (2013.01); *G08G 5/0069* (2013.01); *H04K 3/82* (2013.01); *H04W 4/021* (2013.01); *H04K 3/45* (2013.01); *H04K 2203/22* (2013.01)

(56) References Cited

U.S. PATENT DOCUMENTS

| | | | |
|---|---|---|---|
| 9,672,727 B1* | 6/2017 | Alexander | G08B 25/016 |
| 9,767,699 B1* | 9/2017 | Borghese | G08G 5/0013 |
| 9,773,422 B2 | 9/2017 | Wouhaybi et al. | |
| 9,858,947 B2* | 1/2018 | Hearing | G01S 3/80 |
| 2004/0186739 A1* | 9/2004 | Bolles | G08B 13/19656 |
| | | | 340/506 |
| 2006/0133612 A1 | 6/2006 | Abedi et al. | |
| 2008/0033604 A1 | 2/2008 | Margolin | |
| 2009/0243852 A1* | 10/2009 | Haupt | G01W 1/00 |
| | | | 340/541 |
| 2010/0077456 A1 | 3/2010 | Drive et al. | |
| 2010/0077483 A1 | 3/2010 | Stolfo et al. | |
| 2014/0277852 A1 | 9/2014 | Lundqvist et al. | |
| 2014/0306799 A1 | 10/2014 | Ricci | |
| 2014/0347675 A1* | 11/2014 | Romashkin | G01P 3/685 |
| | | | 356/614 |
| 2015/0049189 A1 | 2/2015 | Yau et al. | |
| 2015/0254988 A1 | 9/2015 | Wang et al. | |
| 2015/0302858 A1* | 10/2015 | Hearing | G10L 19/00 |
| | | | 381/58 |
| 2015/0321758 A1 | 11/2015 | Sarna, II | |
| 2015/0339912 A1* | 11/2015 | Farrand | G08B 25/001 |
| | | | 340/501 |
| 2016/0029315 A1 | 1/2016 | Kates | |
| 2016/0125713 A1* | 5/2016 | Blech | G08B 13/187 |
| | | | 348/143 |
| 2016/0180719 A1* | 6/2016 | Wouhaybi | G08G 5/0082 |
| | | | 701/4 |
| 2016/0191559 A1 | 6/2016 | Mhatre et al. | |
| 2016/0225264 A1* | 8/2016 | Taveira | G08G 5/0069 |
| 2016/0253907 A1 | 9/2016 | Taveira | |
| 2017/0019644 A1 | 1/2017 | K V et al. | |
| 2017/0039413 A1* | 2/2017 | Nadler | G06K 9/6201 |
| 2017/0076610 A1* | 3/2017 | Liu | G08G 5/0069 |
| 2017/0134895 A1* | 5/2017 | Rabb | G08B 25/008 |
| 2017/0183096 A1* | 6/2017 | Meinhart | B64C 39/024 |
| 2018/0024236 A1* | 1/2018 | Zorea | G08G 5/0078 |
| 2018/0080747 A1* | 3/2018 | Nishikata | F41H 11/02 |
| 2018/0276998 A1* | 9/2018 | Yu | G06F 16/29 |
| 2019/0199756 A1 | 6/2019 | Correnti | |

OTHER PUBLICATIONS

International Search Report and Written Opinion in International Application No. PCT/US2016/55064, dated Dec. 27, 2016, 12 pages.
PCT International Search Report and Written Opinion in International Application. No. PCT/US2018/067348, dated Apr. 8, 2019, 19 pages.
Extended European Search Report in European Application No. 16852803.2, dated May 23, 2019, 10 pages.
Rohde & Schwarz, "Protecting the Sky: Signal Monitoring of Radio Controlled Civilian Unmanned Aerial Vehicle and Possible Countermeasures," Whitepaper, Mar. 4, 2015, 14 pages, XP055453794.
PCT International Preliminary Report on Patentability in International Application No. PCT/US2018/067348, dated Jun. 23, 2020, 9 pages.

* cited by examiner

DRONE DETECTION SYSTEMS

CROSS-REFERENCE TO RELATED APPLICATIONS

This application claims the benefit of the U.S. Provisional Patent Application No. 62/235,042 filed Sep. 30, 2015 and entitled "Drone Detection Systems," which is incorporated herein by reference in its entirety.

TECHNICAL FIELD

This disclosure relates to monitoring technology and drone device detection.

BACKGROUND

Unmanned aerial vehicles (UAVs) such as drone devices often pose public safety and privacy concerns to users when the drone devices are used to collect unauthorized aerial surveillance without consent. For example, drone devices may be used to remotely capture video footage in areas within a property where a property owner expects privacy.

SUMMARY

Techniques are described for a drone detection system that uses one or more drone detectors to detect the presence of a drone within a predetermined geographic area surrounding a particular property.

According to at least one aspect of the subject matter described by this specification, a method, system, and apparatus, including computer programs encoded on storage devices are disclosed for implementing the drone detection system. In some aspects, a device may include a network interface, one or more sensors, one or more processors, and one or more storage devices that include instructions that are operable, when executed by the one or more processors, to cause the one or more processors to perform operations. The operations may include monitoring a predetermined geographic area that surrounds a particular property, determining that a drone device is within the predetermined geographic area that surrounds the particular property, determining whether the drone device that is detected within the predetermined geographic area that surrounds the property is an unauthorized drone device, and in response to determining that the drone device that is detected within the predetermined geographic area that surrounds the property is an unauthorized drone device, transmitting a signal indicating the detection of the unauthorized drone device within the predetermined geographic area that surrounds the property.

These and other versions each may optionally include one or more of the following features. For instance, the predetermined geographic area that surrounds a particular property may include the airspace that surrounds the property. Alternatively, or in addition, the predetermined geographic area that surrounds the particular property may include a geographic area that spans a predetermined threshold distance from the particular property.

In some aspects, monitoring a predetermined geographic area that surrounds a particular property may include capturing sensor data that is output from at least one of the one or more sensors.

In some aspects, determining that a drone device is within the predetermined geographic area that surrounds the particular property may include determining, based on the detection of first data that includes one or more sensor signals, that a drone device is within the predetermined geographic area that surrounds the particular property, wherein the one or more sensor signals include (i) audio signals from a propeller of the drone device, (ii) video signals of nearby airspace, (iii) thermal signals generated from the drone device, (iv) radar detection of aerial speed of the drone device, (v) radiofrequency (RF) detection of oscillation in electronic circuits of the drone device, or (vi) RF communications.

In some aspects, determining that a drone device is within the predetermined geographic area that surrounds the particular property may include confirming, based on the processing of second data associated with the property, that a drone device exists within the predetermined geographic area that surrounds the particular property. In some aspects, the second data includes video or image data captured by a security camera that is located within a predetermined distance from the particular property.

In some aspects, determining whether the drone device that is detected within the predetermined geographic area that surrounds the property is an unauthorized drone device may include generating an electronic signature that is associated with the drone device that is detected within the predetermined geographic area that surrounds the property.

In some aspects, determining whether the drone device that is detected within the predetermined geographic area that surrounds the property is an unauthorized drone device may include accessing a database storing one or more electronic signatures that are each associated with a respective authorized drone device, and determining whether the generated electronic signature that is associated with the drone device that is detected within the predetermined geographic area that surrounds the property is included in the database storing one or more electronic signatures that are each associated with a respective authorized drone device.

In some aspects, the operations may include determining that the drone that is detected within the predetermined geographic area that surrounds the property is an unauthorized drone device when the generated electronic signature is not included in the database.

In some aspects, the operations include determining that the drone that is detected within the predetermined geographic area that surrounds the property is an authorized drone device when the generated electronic signature is included in the database.

In some aspects transmitting a signal indicating the detection of the unauthorized drone device within the predetermined geographic area that surrounds the property may include transmitting a notification to a user device, a monitor control unit, a central alarm station, or a combination thereof, that alerts the user device, the monitor control unit, or the central alarm station server, or a combination therefo, of the presence of the unauthorized drone device within the predetermined geographic area that surrounds the property. In some aspects, the notification may include information that identifies the drone device that is detected within the predetermined geographic area that surrounds the property. In some aspects, the information that identifies the drone device that is detected within the predetermined geographic area that surrounds the property may include a drone device type, a time of detection of the drone device, or both.

In some aspects, the operations may include evaluating the security threat posed by the drone that is detected within the predetermined geographic area that surrounds the property.

In some aspects, the operations may include in response to determining that the security threat posed by the drone that is detected within the predetermined geographic area that surrounds the property exceeds a predetermined threshold, transmitting a notification to the central alarm station server.

In some aspects, the operations may include in response to determining that the security threat posed by the drone that is detected within the predetermined area that surrounds the property does not exceed a predetermined threshold, transmitting a notification to the user device.

In some aspects, the notification to the monitor control unit includes an instruction that instructs the monitor control unit to initiate a particular action associated with the property.

In some aspects, the particular action may include lowering one or more shades, turning on one or more lights, turning off one or more lights, closing one or more garage doors, locking one or more doors, or a combination therefo.

The details of one or more implementations are set forth in the accompanying drawings and the description below. Other features will be apparent from the description and drawings.

DETAILED DESCRIPTION

Techniques are described for detecting unauthorized use of drone devices at or near (e.g., within a threshold distance of) private properties where the drone devices may pose public safety and privacy concerns. In some implementations, a drone detection device may be used to detect the presence of unauthorized drone devices at or near a property. In some instances, the drone detection device may be used to monitor personal airspace surrounding a property, detect a drone device within the personal airspace, determine that the detected drone device is unauthorized to be located within the personal airspace, and transmit a signal indicating the detection of the unauthorized drone device within the personal airspace.

Figure 1:
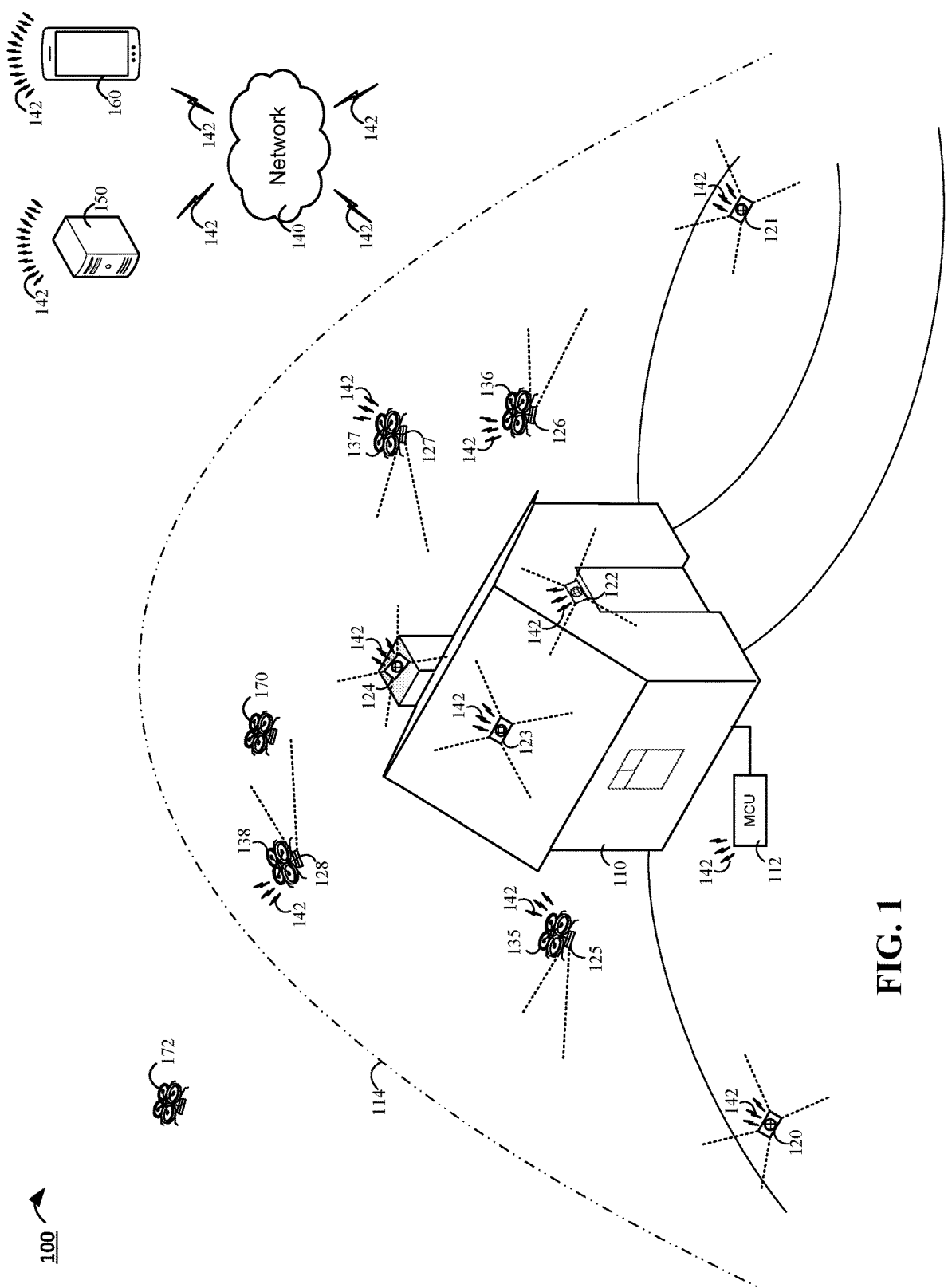
FIG. 1 is a contextual diagram of an example of a system for detecting the presence of a drone device near a property.

FIG. 1 is a contextual diagram of an example of a system 100 for detecting the presence of a drone device near a property 110. The system 100 may include, for example, monitor control unit 112, one or more drone detectors 120, 121, 122, 123, 124, 125, 126, 127, 128, one or more authorized drones 135, 136, 137, 138, a network 140, one or more communications links 142, a monitoring application server (or central alarm station server) 150, and one or more client devices 160.

The contextual diagram of system 100 provides an example of a system that uses multiple drone detectors 120, 121, 122, 123, 124, 125, 126, 127, 128 to monitor a predetermined geographic area 114 that surrounds the property 110. The drone detectors used to monitor the predetermined geographic area 114 surrounding the property 110 may include different types of drone detectors. For example, the drone detectors may include stationary drone detectors that are coupled to one or more portions of the property 110. Such stationary drone detectors may include a stationary drone detector 122 positioned above a front door of property 110, a stationary drone detector 123 coupled to the roof of property 110, a stationary drone detector 124 coupled to the chimney of property 110. Stationary drone detectors may be strategically placed to monitor a particular portion of the geographic area surrounding the property 110 that is in the vicinity of a respective stationary drone detector. For example, a stationary drone detector 123 can be configured to monitor the portion of the predetermined geographic area 114 that is above the roof of the property 110. Similarly, a drone detector 122 that is coupled to the property 110 above the front door may be used to monitor for drones in the vicinity of the front door of the property 110.

Alternatively, or in addition, one or more stationary drone detectors may be coupled to features of the geographic area 114 surrounding the property 110. For instance, a stationary drone detector 120 may be positioned on the ground at the west entrance to the property 110 and a stationary drone detector 121 may be positioned on the ground at the east entrance to the property 110. Such stationary drone detectors 120, 121 may be used to monitor the portion of the predetermined geographic area 114 that is in the vicinity of the stationary drone detectors in an effort to detect the presence of a drone device as soon as the drone device crosses within a predetermined geographic area 114 of the property 110. The stationary drone detectors may be coupled to any other feature of the geographic area 114 surrounding the property 110 such as rock formations, trees, or the like. Alternatively, or in addition, such stationary drone detectors may also be coupled to one or more other physical structures that are within the geographic area 114 surrounding the property 110. Such physical structures may include, for example, a fence, a shed, a barn, a telephone pole, a mailbox, or the like.

Alternatively, or in addition, the drone detectors of system 100 may utilize one or more flight-enable drones that are equipped with a drone detector. For example, the system 100 may use one or drone detectors 125, 126, 127, 128 that have been mounted to one or more authorized drones 135, 136, 137, 138 to monitor the predetermined geographic area 114 surrounding the property 110. Equipping a drone device 135, 136, 137, 138 with a drone detector 125, 126, 127, 128 provides the advantage of a mobile drone detector. Such a mobile drone detector may have a dynamic range of surveillance that provides flexibility in monitoring the predetermined geographic area 114 surrounding the property 110.

However, the present disclosure need not be limited to flight-enabled drone detectors. For instance, in some implementations, the drone detectors may also be mounted to non-stationary, land-based drone devices. For instance, a drone detectors may be mounted to an authorized drone device that is capable of moving throughout the geographic area 114 surrounding the property 110 on the ground. Such non-stationary, land-based drone detectors provide a legitimate occupant of the property 110 the ability to dynamically adjust the portions of the property 110 that are monitored. It is contemplated that a particular drone detection system may include any number of drone detectors that are associated with any combination of mobility types including non-mobile drone detectors, drone detectors that are mounted on mobile, flight-enabled drones, drone detectors that are mounted to mobile, land-based drones, or the like.

Mobile drone detectors such as drone detectors 125, 126, 127, 128 mounted to authorized drone device 135, 136, 137, 138, respectively, may be configured to pursue and/or engage a detected drone device that has been determined to be unauthorized. For instance, if a drone device that is detected within the predetermined geographic region surrounding property 110 is determined to be unauthorized, the authorized drones 135, 136, 137, 138 may track the unauthorized drone, and use the equipped drone detector to jam the unauthorized drone's signals. Alternatively, or in addition, the authorized drones may take one or more actions to chase the unauthorized drone device away, disable the unauthorized drone, or the like.

Each of the drone detectors 120, 121, 122, 123, 124, 125, 126, 127, 128 may monitor at least a portion of the predetermined geographic area 114 surrounding the property 110. During the course of such monitoring, a particular drone detector 128 that is mounted to a drone device 138 may detect one or more signals from an unidentified drone device 170. The detected signals may include, for example, audio signals from drone device propellers, video signals of nearby airspace, image signals of nearby airspace, thermal signals generated from the drone device, radar detection of aerial speed of the drone device, radiofrequency detection of oscillation in electronic circuits of the drone device, or the like. Alternatively, or in addition, the detected signals may include the unidentified drone device's 170 RF communications. For example, the unidentified drone device 170 may communicate with a drone operator, drone base station, or other drone controller. The drone detector 128 may detect the unidentified drone device's 170 use of RF communications, intercept the RF communications, or the like and infer the presence of the unidentified drone device 170.

The drone detector 128 may generate a signature for the unidentified drone device 170. The drone detector 128 may search a database of authorized drones in order to determine if the generated signature is included in the database of authorized drone signatures. In this instance, the drone detector 128 may determine that the unidentified drone device 170 is an unauthorized drone, based at least in part, on a determination of whether the generated signature that is associated with the unidentified drone device is (or is not) included in a database of authorized drone device signatures. In response to determining that the generated signature is not included in the database, the drone detector 128 may transmit one, or multiple, signals via the network 140 using one or more wired, or wireless, communication links 142. The transmitted signals may include a notification that alerts one or more other parties to the presence of the unauthorized drone. Alternatively, or in addition, the drone detector 128 may engage the unauthorized drone device using one or more of the tactics described herein.

A drone detector such as drone detector 128 may have a database of authorized drone device signatures stored in the drone detector's onboard memory. However, the present disclosure need not be so limited. Instead, in the same, or other implementations, a drone detector 128 may capture one or more signals associated with an unidentified drone device 170, and transmit the one or more signals to a server such as a monitoring application server (or central alarm station server) 150, which may generate a drone device signature, search a database of authorized drone signatures, and determine whether the unidentified drone device 170 is an authorized or unauthorized drone device. Then, the server may transmit data indicating whether the unidentified drone device 170 is an authorized or unauthorized drone device back to the drone detector 128. In some implementations, the drone detector 128 may communicate directly with the monitoring application server 150 using the network 140 and one or more wired, or wireless, communication links. Alternatively, or in addition, one or more respective drone detectors may communicate with the monitoring application server 150 via the monitor control unit which may serve as an interface between the monitoring application server 150 and one or more respective drone detectors.

In some implementations, the drone detector 128 may transmit a notification via the network 140 using one or more communication links 142 to a user device 160 that is associated with a legitimate occupant of the property 110. The notification, when received and processed by the user device 160, may result in visual or audio alert (or both) that provides an indication to the legitimate occupant of the property 110 of the existence of the unauthorized drone. The graphical alert may include information identifying the unauthorized drone device 170 and one or more options for responding to the unauthorized drone. The one or more options may include, for example, notifying a central alarm station server, notifying law enforcement, instructing the drone device 138 equipped with the drone detector 128 to engage the unauthorized drone device 170 (e.g., jamming the unauthorized drone, flashing lights at the unauthorized drone, crashing into the unauthorized drone, using water tank/pump/sprayer to spray water on the unauthorized drone, or the like), or the like.

In the same, or other implementations, a drone device can be dispatched to confront (by, e.g., jamming the unauthorized drone, flashing lights at the unauthorized drone, crashing into the unauthorized drone, using water tank/pump/sprayer to spray water on the unauthorized drone, or the like) an unidentified drone in response to a notification from a drone detector even if the drone device is not equipped with a drone detector. For example, a drone detector may detect the presence of an unidentified drone device, and then determine that the drone device is unauthorized. In response to determining that the drone device is unauthorized, the drone detector may transmit an instruction to a drone base station that initiates deployment of one or more drone devices that can confront the unauthorized drone device. Though the deployed drone may, or may not, include a drone detector, the deployed drone can be sufficiently equipped (e.g., with a jamming device, flashlight, water sprayer, or the like) to confront, disable, chase away, or the like the unauthorized drone device. Though the example herein includes the drone detector instructing a drone base station to deploy a drone device to confront the unidentified drone device, the present disclosure need not be so limited. Instead, the drone detector may issue such instructions directly to another drone device. Alternatively, or in addition, the drone detector may issue such instructions to a monitoring application server, and then the monitoring application server may transmit an instruction to a drone, drone base station, or the like which triggers the deployment of a drone device to confront the identified drone device.

Alternatively, or in addition, the drone detector 128 may transmit a notification via the network 140 using one or more communications links 142 to monitor control unit 112. The notification transmitted to the monitor control unit 112 may include information identifying the unauthorized drone device 170 and one or more instructions that instruct the monitor control unit 112 to initiate one or more actions. The one or more actions may include, for example, lowering one or more window shades, turning on one or more lights, turning off one or more lights, locking one or more doors, activating one or more holograms, or the like. Alternatively, or in addition, the notification from the drone detector 128 may be received by the monitor control unit 112, and then the monitor control unit can generate an alarm event that is forwarded to the monitoring application server (or central alarm station sever) 250.

Alternatively, or in addition, the drone detector 128 may transmit a notification via the network 140 using one or more communications links 142 to the monitoring application server (or central alarm station server) 150. The notification may include information identifying the unauthorized drone, and a request for assistance in addressing the threat posed by the unauthorized drone. In one implementation, the monitoring application server (or central alarm station server) 150 may initiate a communication to one or more law enforcement agencies based on the received notification. In response, one or more law enforcement officers may deploy to the property 110.

In the example of system 100, one or more unidentified drones 172 may also be traveling overhead of property 110. However, a drone such as unidentified drone device 172 may not be detected by one or more drone detectors 120, 121, 122, 123, 124, 125, 126, 127, 128 if the unidentified drone device 172 is not within the predetermined geographic area 114 that surrounds the property 110.

Figure 2:
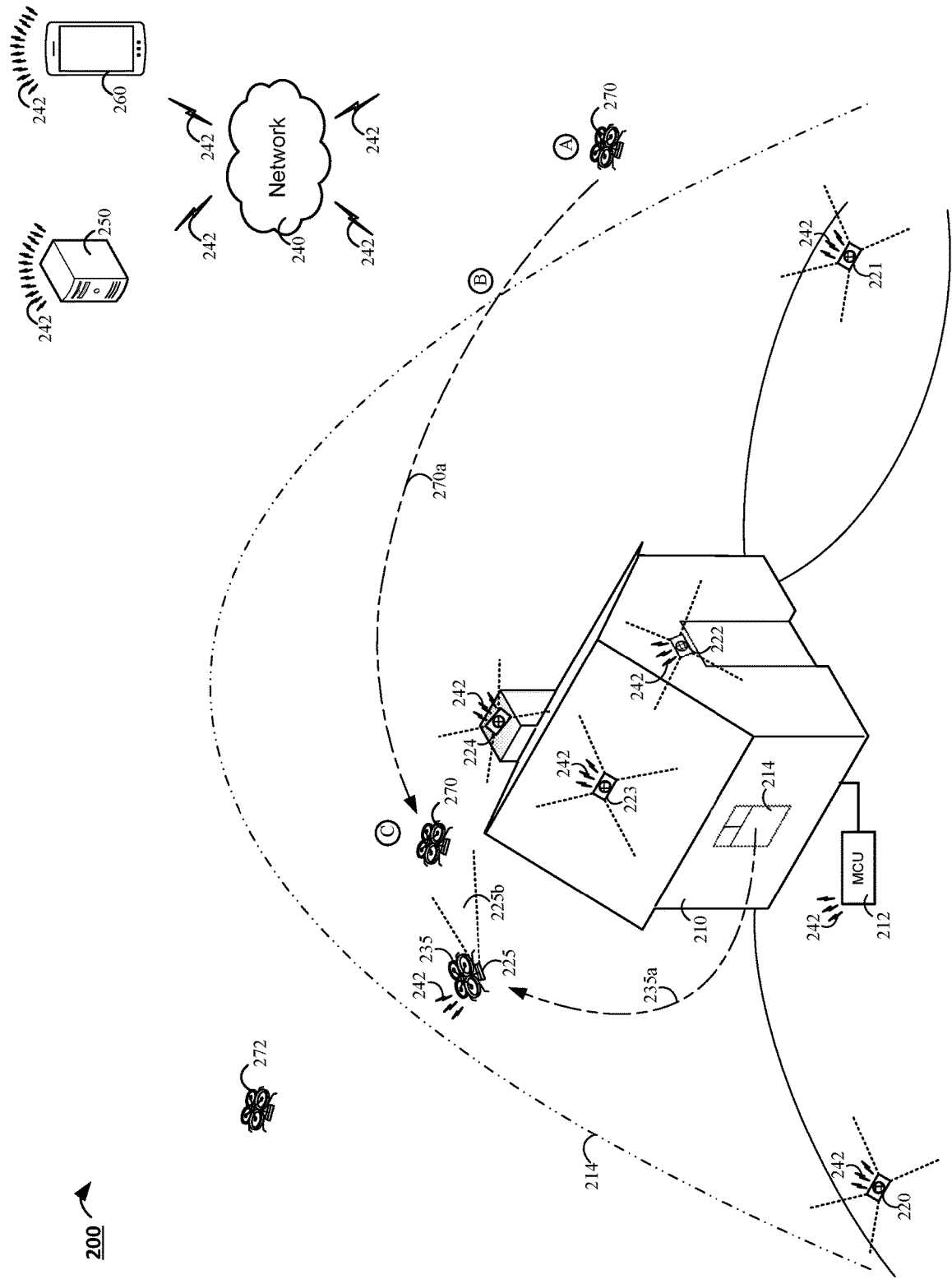
FIG. 2 is another contextual diagram of an example of a system for detecting the presence of a drone device near a property.

FIG. 2 is another contextual diagram of an example of a system 200 for detecting the presence of a drone device near a property 210 The system 200 may include, for example, monitor control unit 212, one or more drone detectors 220, 221, 222, 223, 224, 225, an authorized drone 235, a network 240, one or more communications links 242, a monitoring application server (or central alarm station server) 250, and one or more client devices 260. The system 200 is substantially similar to the system 100 described with reference to FIG. 1. However, the system 200 provides an example of communication between drone detectors while monitoring a predetermined geographic area 214 that surrounds the property 210.

Multiple drone detectors 220, 221, 222, 223, 224 may monitor a predetermined geographic area 214 that surrounds the property 210 for the presence of one or more drone devices. In some implementations, each drone detector of the multiple drone detectors 220, 221, 222, 223, 224 may monitor a particular portion of the predetermined geographic area 214. Then, once a drone detector 220, 221, 222, 223, 224 detects the presence of a particular drone, the respective drone detector that detected the drone may communicate with one or more other components of system 200 such as the monitoring control unit 212, one or more other drone detectors 220, 221, 222, 223, 224, 225, monitoring application server (or central alarm station server) 250, or a drone base station housing one or more drones (not shown) in an effort to track and identify the detected drone.

By way of example, at stage A, an unidentified drone device 270 may approach a boundary of the predetermined geographic area 214 that surrounds the property 210 on a flight path 270a. Since the unidentified drone device 270 is outside the boundary of the predetermined geographic area 214 that surrounds the property 210 at stage A, the unidentified drone device 270 is not within range of one or more drone detectors 220, 221, 222, 223, 224.

In some implementations, one or more drone detectors may be strategically placed to detect unidentified drones as the drones enter a predetermined geographic area 214 that surrounds the property 210. For example, at stage B, the unidentified drone device 270 crosses the boundary of the predetermined geographic area 214 that surrounds the property 210. Upon crossing the boundary of the predetermined geographic area 214, the drone detector 221 that is strategically placed to detect drones crossing into the predetermined geographic area 214 detects one or more signals from the unidentified drone device 270 using one or more sensors. In some implementations, the drone detector 221 may generate a signature for the unidentified drone, and determine whether the drone device 270 is an authorized drone device as described with respect to system 100 of FIG. 1. However, in other implementations, the drone detector 221 may notify one or more components of system 200 of the presence of the unidentified drone device 270.

For example, the drone detector 221 may transmit a notification to (i) the drone detector 225 that is mounted to a drone device 235, (ii) the drone device equipped with the drone detector 235, or (iii) both. At the time of receipt of the instruction, the drone device 235 that is equipped with the drone detector 225 may be located within the property 210. In addition, in some implementations, the drone detector 221 may also transmit a notification to the monitor control unit 212 with an instruction to open the window 214. In response to the received instruction, the drone device 235 equipped with the drone detector 225 may navigate 235a along a navigational path 235a that is selected in an effort to intercept the unidentified drone device 270 through the window opened by the monitor control unit 212 (or through a window, door, vent, or the like htat was previously opened independently of an instruction from the monitor control unit 212). Use of a drone device 235 equipped with a drone detector 225 to intercept the unidentified drone device 270, and capture 225b additional signal data associated with the unidentified drone device 270 may result in captured signal data that is more accurate. The captured signal data may be more accurate because the drone detector's close proximity to the unidentified drone device may reduce interference associated with the captured signal. Because the captured signal data is more accurate, a drone signature generated based on the more accurate signal data will also have a higher degree of accuracy.

The drone device 235 may use its equipped drone detector 225 in order to determine whether the unidentified drone device 270 is an authorized drone device or an unauthorized drone device. For example, at stage C, the drone detector 225 may use one or more onboard sensors to detect one or more signals that are associated with the unidentified drone device 270. The drone detector 225 may generate a signature for the unidentified drone device 270. The drone detector 225 may search a database of authorized drones in order to determine if the generated signature is included in the database of authorized drone signatures. In this instance, the drone detector 225 may determine that the unidentified drone device 270 is an unauthorized drone, based at least in part, on a determination of whether the generated signature that is associated with the unidentified drone device is (or is not) included in a database of authorized drone device signatures. In response to determining that the generated signature is not included in the database, the drone detector 225 may transmit one, or multiple, signals via the network 240 using one or more wired, or wireless, communication links 242. The transmitted signals may include a notification that alerts one or more other parties to the presence of the unauthorized drone. Alternatively, or in addition, the drone detector 225 may engage the unauthorized drone device using one or more of the tactics described herein.

The implementation of system 200 described with respect to FIG. 2 utilizes communications between drone detectors in an effort to reduce the number of drone detectors mounted to drones flying around the predetermined geographic area 214 that surrounds the property. Such an implementation may facilitate a discrete implementation with ground based sensors scattered through the geographic area 214 surrounding the property 210 that provides the same level of security as the system 100 described with respect to FIG. 1.

The aforementioned example describes a scenario where multiple drone detectors communicate directly. However, other implementations may be employed. For instance, upon detection of the unidentified drone device 270 at stage B, the drone detector 221 may transmit signal data associated with the unidentified drone device 270 to the monitor control unit 212. In such an implementation, the monitor control unit 212 may analyze the received signal data, and determine whether or not to deploy a subsequent drone detector 225 that is mounted to a drone device 235. If the monitor control unit 212 determines to deploy the drone detector 225, the monitor control unit 212 may transmit an instruction to (i) the drone detectors 225, (ii) the drone device 235, or (iii) both, in order to deploy the drone device 235 equipped with the drone detector 225 to intercept the unidentified drone device 270.

In the example of system 200, one or more unidentified drone 272 may also be traveling overhead of property 210. However, a drone such as unidentified drone device 272 may not be detected by one or more drone detectors 220, 221, 222, 223, 224 if the unidentified drone device 172 is not within the predetermined geographic area 214 that surrounds the property 210.

In the example of 200, a drone detector 221 that detects signal data associated with an unidentified drone notifies a drone 235 equipped with a drone detector 225 to deploy from the property 210. However, it is contemplated that the drone detector 221 could notify other drone devices to respond in the same or similar manner as drone 235 equipped with the drone detector 225. For instance, the drone detector 221 could notify a drone base station housing one or more drones, and instruct the drone base station to deploy one or more drone devices to confront the unidentified drone device. Alternatively, or in addition, the drone detectors 221 may transmit a similar notification directly to a drone equipped with a drone detector that is already patrolling the airspace associated within predetermined geographic area 214 that surrounds the property 210. In response to receiving the notification, the deployed drone device that is on patrol may confront the unidentified drone device.

Figure 3:
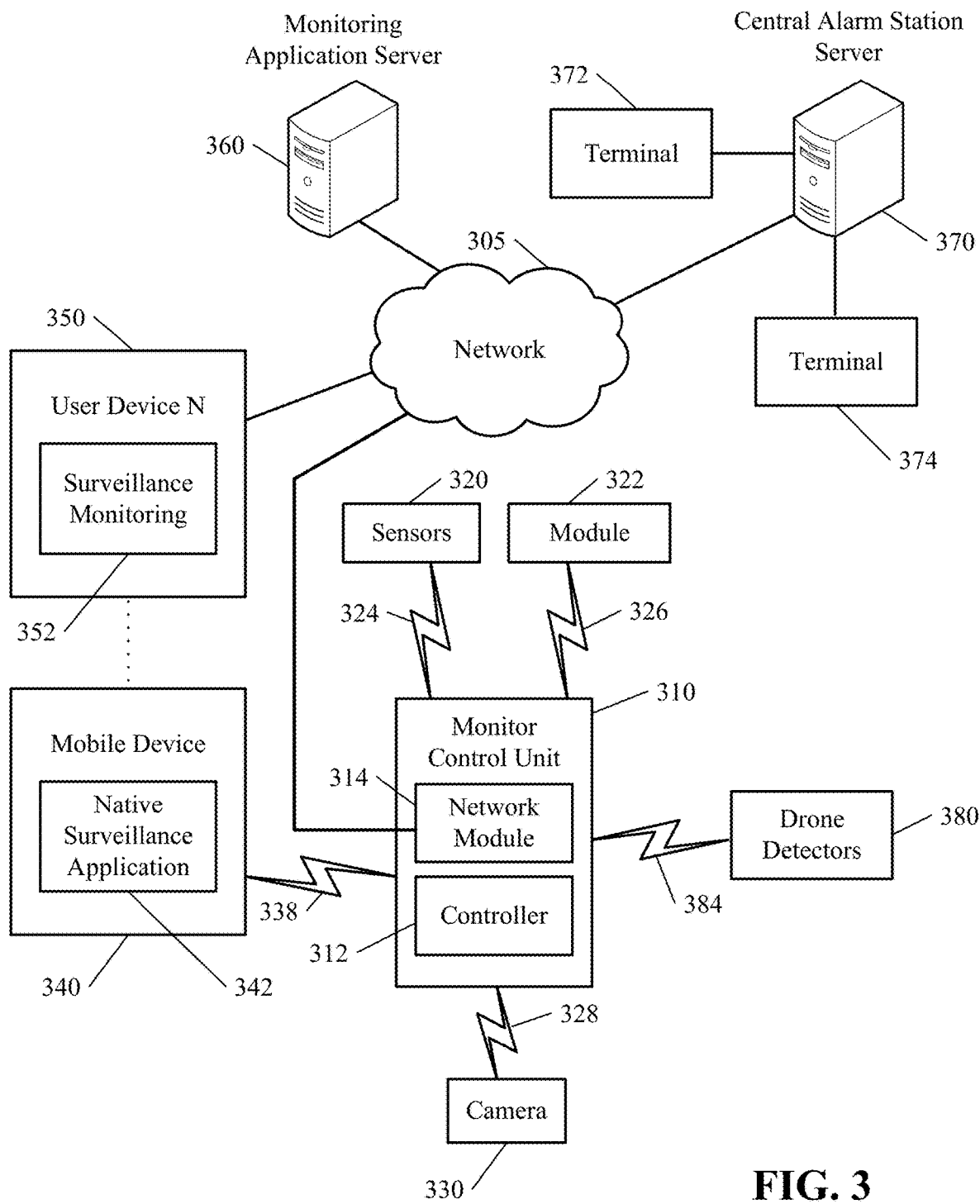
FIG. 3 is a block diagram of an example of a system configured to detect the presence of drones near a property.

FIG. 3 illustrates an example of an electronic system 300 configured to detect the presence of drone devices near a property. The electronic system 300 includes a network 305, a monitor control unit 310, one or more user devices 340, 350, a monitoring application server 360, a central alarm station server 370, and one or more drone detectors 380. In some examples, the network 305 facilitates communications between the monitoring application server 360, and the central alarm station server 370.

The network 305 is configured to enable exchange of electronic communications between devices connected to the network 305. For example, the network 305 may be configured to enable exchange of electronic communications between the monitoring system control unit 310, the one or more user devices 340, 350, the monitoring application server 160, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The monitoring system control unit 310 includes a controller 312 and a network module 314. The controller 312 is configured to control a monitoring system (e.g., a home alarm or security system) that includes the monitoring system control unit 310. In some examples, the controller 312 may include a processor or other control circuitry configured to execute instructions of a program that controls operation of an alarm system. In these examples, the controller 312 may be configured to receive input from sensors, detectors, or other devices included in the alarm system and control operations of devices included in the alarm system or other household devices (e.g., a thermostat, an appliance, lights, etc.). For example, the controller 312 may be configured to control operation of the network module 314 included in the monitoring system control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the monitoring system control unit 310 to communicate over a local area network and/or the Internet. The network module 314 also may be a voiceband modem configured to enable the alarm panel to communicate over the telephone lines of Plain Old Telephone Systems (POTS).

The monitoring system that includes the monitoring system control unit 310 includes one or more sensors or detectors. For example, the monitoring system may include multiple sensors 320. The sensors 320 may include a contact sensor, a motion sensor, a glass break sensor, or any other type of sensor included in an alarm system or security system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The monitoring system control unit 310 communicates with the module 322 and the camera 330 to perform surveillance or monitoring. The module 322 is connected to one or more devices that enable home automation control. For instance, the module 322 may be connected to one or more lighting systems and may be configured to control operation of the one or more lighting systems. Also, the module 322 may be connected to one or more electronic locks at the property and may be configured to control operation of the one or more electronic locks (e.g., control Z-Wave locks using wireless communications in the Z-Wave protocol). Further, the module 322 may be connected to one or more appliances at the property and may be configured to control operation of the one or more appliances. The module 322 may include multiple modules that are each specific to the type of device being controlled in an automated manner. The module 322 may control the one or more devices based on commands received from the monitoring system control unit 310. For instance, the module 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building monitored by the monitoring system control unit 310. The camera 330 may be configured to capture single, static images of the area and also video images of the area in which multiple images of the area are captured at a relatively high frequency (e.g., thirty images per second). The camera 330 may be controlled based on commands received from the monitoring system control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the monitoring control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring application server 360 over the Internet. In these implementations, image data captured by the camera 330 does not pass through the monitoring system control unit 310 and the camera 330 receives commands related to operation from the monitoring application server 360.

The system 300 further includes one or more drone detectors 380. The drone detectors 380 may be electronic devices that include sensors to detect the presence of unmanned aerial devices (UADs), such as drone devices. For instance, the sensors may be capable of detecting various types of signals that are generated from the operation of a drone device such as, for example, audio signals from drone device propellers, video signals of nearby airspace, thermal signals generated from the drone devices, radar detection of aerial speed of drone devices, or radiofrequency (RF) detection of oscillation in electronic circuits of drone devices.

The one or more drone detectors 380 may be placed within different locations within a property. For example, in some instances, the one or more drone detectors 380 may be placed near boundaries of the properties such that the one or more drone detectors 380 may detect the presence of an unauthorized drone device at or near the property. In some instances, the one or more drone detectors 380 may be placed in different locations. For example, a first drone device may be placed near a north entrance to detect incoming drone devices from the north side of the property and a second drone detector may be placed near a south entrance to detect incoming drone devices from the south side of property. The one or more drone detectors 380 may be placed in the property (e.g., at a garage, a door, or window of the property) or external to the property (e.g., on a roof, chimney, antennae, etc., or in an external housing located on the ground or on a structure).

The drone detectors 380 may include several hardware components. For example, the drone detectors 380 may include one or more cameras, one or more proximity sensors, one or more microphones, one or more gyroscopes, one or more accelerometers, one or more magnetometers, a global positioning system (GPS) unit, an altimeter, one or more sonar or laser sensors, spectrum analyzers, and/or any other types of sensors that aid in the detection of drone devices at or near the property. The one or more drone detectors 380 may include control processors that process output from the various sensors and control the drone detectors 380 to determine the presence of drone devices at or near the property. In this regard, the control processors detect particular signals that enable the drone detectors to identify a drone device.

In addition, the one or more drone detectors 380 may store data that describes attributes of the property. For instance, the one or more drone detectors 380 may store a floorplan, a three-dimensional model, and/or a site map of the property that enables the drone detectors 380 to determine the presence of a drone device within a particular location of the property or within a particular external space on or near the property. During initial configuration, the one or more drone detectors 380 may receive the data describing attributes of the property, determine a frame of reference to the data (e.g., a home or reference location in the property), and assess sensor data related to the property based on the frame of reference and the data describing attributes of the property.

In some examples, the one or more drone detectors 380 may include data capture and recording devices. In these examples, the one or more drone detectors 380 may include one or more cameras, one or more motion sensors, one or more microphones, one or more temperature sensors, one or more humidity sensors, one or more air flow sensors, and/or any other types of sensors that may be useful in capturing monitoring data related to the property and users in the property. For instance, the data capture and recording devices may be used to enhance detection signals of a drone device at or near the property. For example, the one or more temperature sensors may indicate heat signatures associated with the drone device, the one or more air flow sensors may indicate changes aerial signals generated by the drone device, and the one or more microphones may be used to detect harmonic patterns that indicate drone device activity. In some instances, the various signals generated by the different data capture and recording devices may be compared to verify the detection of a drone device at or near the property.

In some implementations, the one or more drone detectors 380 may include output devices. In these implementations, the one or more drone detectors 380 may include one or more displays, one or more speakers, one or more projectors, and/or any type of output devices that allow the one or more drone detectors 380 to communicate information to a nearby user. The one or more projectors may include projectors that project a two-dimensional image onto a surface (e.g., wall, floor, or ceiling) and/or holographic projectors that project three-dimensional holograms into a nearby space.

The one or more drone detectors 380 also may include a communication module that enables the one or more drone detectors 380 to communicate with the monitoring system control unit 310, each other, and/or other devices. The communication module may be a wireless communication module that allows the one or more drone detectors 380 to communicate wirelessly. For instance, the communication module may be a Wi-Fi module that enables the one or more drone detectors 380 to communicate over a local wireless network at the property. The communication module further may be a 900 MHz wireless communication module that enables the one or more drone detectors 380 to communicate directly with the monitoring system control unit 310. Other types of short-range wireless communication protocols, such as Bluetooth, Bluetooth LE, Zwave, Zigbee, etc., may be used to allow the one or more drone detectors 380 to communicate with other devices in the property.

The one or more drone detectors 380 further may include processor and storage capabilities. The one or more drone detectors 380 may include any suitable processing devices that enable the one or more drone detectors 380 to operate applications and perform the actions described throughout this disclosure. In addition, the one or more drone detectors 380 may include solid state electronic storage that enables the one or more drone detectors 380 to store applications, configuration data, collected sensor data, and/or any other type of information available to the one or more drone detectors 380.

In some implementations, the one or more drone detectors 380 may additionally be used to perform routine surveillance operations on a property. For instance, the one or more drone detectors 380 may be assigned to one or more particular properties within a geographic location and may routinely collect surveillance footage during specified time periods (e.g., after dark), which may then be transmitted to the application server 360 for transmitting back to each particular property owner. In such implementations, the property owner may receive the surveillance footage over the network 305 as a part of a service provided by a security provider that operates the application server 360. For example, transmissions of the surveillance footage collected by the one or more drone detectors 380 may be part of a premium security service package provided by a security provider.

In some implementations, the one or more drone detectors 380 may be drone devices, or placed on drone devices to perform surveillance at or near a property. For example in such implementations, surveillance by the one or more drone detectors 380 may be conducted by particular drone devices that navigate through the property using specific navigation patterns. For instance, initial configuration of the one or more drone detectors 380 may include learning of one or more navigation patterns in which a user provides input to control the one or more drone detectors 380 to perform a specific detection action (e.g., enable a particular detector sensor based on the features of the property). In this regard, the one or more drone detectors 380 may learn and store the navigation patterns such that the one or more drone detectors 380 may automatically repeat the specific navigation actions upon a later request.

In some implementations where the one or more drone detectors 380 may be drone devices, the monitoring system control unit 310 may monitor operational status of the one or more drone detectors 380 and coordinate further operation based on the operational status. In some implementations, the system 300 allows central station operators, first responders, and/or users of the property to interact with and control the one or more drone detectors 380. In some examples, the one or more drone detectors 380 may periodically perform test sequences to ensure the one or more drone detectors 380 will operate correctly if needed. The monitoring system control unit 310 also may arrange the test sequences to occur during periods of time that are convenient for users of the property. For example, the monitoring system control unit 310 may assess sensor data at the property and determine a time period in which the property is unoccupied and unlikely to be occupied until the test sequences complete. In this example, the monitoring system control unit 310 waits until the preferred time period to initiate test sequences for one or more of the one or more drone detectors 380.

The sensors 320, the module 322, the camera 330, and the one or more drone detectors 380 communicate with the controller 312 over communication links 324, 326, 328, and 384, respectively. The communication links 324, 326, 328, and 384 may be a wired or wireless data pathway configured to transmit signals from the sensors 320, the module 322, the camera 330, and the one or more drone detectors 380 to the controller 312. The sensors 320, the module 322, the camera 330, and the one or more drone detectors 380 may continuously transmit sensed values to the controller 312, periodically transmit sensed values to the controller 312, or transmit sensed values to the controller 312 in response to a change in a sensed value.

The communication links 324, 326, 328, and 384 may include a local network. The sensors 320, the module 322, the camera 330, and the one or more drone detectors 180 and the controller 312 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 360 is an electronic device configured to provide monitoring services by exchanging electronic communications with the monitoring system control unit 310, the one or more user devices 340, 350, and the central alarm station server 370 over the network 305. For example, the monitoring application server 360 may be configured to monitor events (e.g., alarm events, detection of drone devices) generated by the monitoring system control unit 310. In this example, the monitoring application server 360 may exchange electronic communications with the network module 314 included in the monitoring system control unit 310 to receive information regarding events (e.g., alarm events) detected by the monitoring system control unit 310. The monitoring application server 360 also may receive information regarding events (e.g., alarm events) from the one or more user devices 340, 350.

In some examples, the monitoring application server 360 may route alarm data received from the network module 314 or the one or more user devices 340, 350 to the central alarm station server 370. For example, the monitoring application server 360 may transmit the alarm data to the central alarm station server 370 over the network 305.

The monitoring application server 360 may store sensor and image data received from the monitoring system and perform analysis of sensor and image data received from the monitoring system. Based on the analysis, the monitoring application server 360 may communicate with and control aspects of the monitoring system control unit 310 or the one or more user devices 340, 350.

The central alarm station server 370 is an electronic device configured to provide alarm monitoring service by exchanging communications with the monitoring system control unit 310, the one or more mobile devices 340, 350, and the monitoring application server 360 over the network 305. For example, the central alarm station server 370 may be configured to monitor alarm events generated by the monitoring system control unit 310. In this example, the central alarm station server 370 may exchange communications with the network module 314 included in the monitoring system control unit 310 to receive information regarding alarm events detected by the monitoring system control unit 310. The central alarm station server 370 also may receive information regarding alarm events from the one or more mobile devices 340, 350 and/or the monitoring application server 360.

The central alarm station server 370 is connected to multiple terminals 372 and 374. The terminals 372 and 374 may be used by operators to process alarm events. For example, the central alarm station server 370 may route alarm data to the terminals 372 and 374 to enable an operator to process the alarm data. The terminals 372 and 374 may include general-purpose computers (e.g., desktop personal computers, workstations, or laptop computers) that are configured to receive alarm data from a server in the central alarm station server 370 and render a display of information based on the alarm data. For instance, the controller 312 may control the network module 314 to transmit, to the central alarm station server 370, alarm data indicating that a sensor 320 detected a door opening when the monitoring system was armed. The central alarm station server 370 may receive the alarm data and route the alarm data to the terminal 372 for processing by an operator associated with the terminal 372. The terminal 372 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

In some implementations, the central alarm station server 370 may exchange communications with an emergency service provider to transmit alarm signal data indicating an alarm event taking place within a property where the monitor control unit 310 may be located. For instance, the central alarm station 370 may transmit incident reports in response to the monitor control unit 310 detecting an alarm event where a user requires emergency assistance. In such instances, the central alarm stations server 370 may be an electronic device that communicates essential safety information to an emergency responder such as an emergency medial responder, a fire department, or a public safety access point.

In some implementations, the central alarm station server 370 may be a third party entity separate from the monitoring application server 360. For example, the central alarm station server 370 may be a central alarm station for a security service provider, a campus security server in a school or school/university police department, or security gateway for a particular residential neighborhood. For instance, the central alarm station server 370 may be registered to the system 300 using a connection bridge such as the application (e.g., the native surveillance application 342), using a unique user identifier such as a username and password or a Quick Response (QR). In other instances, the central alarm station server 370 may be registered to users within a particular geographic location (e.g., a gated residential community) where users within the geographical location are registered to a particular central alarm station server 370 and a particular monitoring application server 360 of the particular location.

The one or more user devices 340, 350 are devices that host and display user interfaces. For instance, the user device 340 is a mobile device that hosts one or more native applications (e.g., the native surveillance application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a native surveillance application 342. The native surveillance application 342 refers to a software/firmware program running on the corresponding mobile device that enables the user interface and features described throughout. The user device 340 may load or install the native surveillance application 342 based on data received over a network or data received from local media. The native surveillance application 342 runs on mobile devices platforms, such as iPhone, iPod touch, Blackberry, Google Android, Windows Mobile, etc. The native surveillance application 342 enables the user device 340 to receive and process image and sensor data from the monitoring system.

The user device 350 may be a general-purpose computer (e.g., a desktop personal computer, a workstation, or a laptop computer) that is configured to communicate with the monitoring application server 360 and/or the monitoring system control unit 310 over the network 305. The user device 350 may be configured to display a surveillance monitoring user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340, 350 communicate with and receive monitoring system data from the monitoring system control unit 310 using the communication link 338. For instance, the one or more user devices 340, 350 may communicate with the monitoring system control unit 310 using various local wireless protocols such as wifi, Bluetooth, zwave, zigbee, HomePlug (ethernet over powerline), or wired protocols such as Ethernet and USB, to connect the one or more user devices 340, 350 to local security and automation equipment. The one or more user devices 340, 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340, 350 are shown as communicating with the monitoring system control unit 310, the one or more user devices 340, 350 may communicate directly with the sensors and other devices controlled by the monitoring system control unit 310. In some implementations, the one or more user devices 340, 350 replace the monitoring system control unit 310 and perform the functions of the monitoring system control unit 310 for local monitoring and long range/offsite communication.

In other implementations, the one or more user devices 340, 350 receive monitoring system data captured by the monitoring system control unit 310 through the network 305. The one or more user devices 340, 350 may receive the data from the monitoring system control unit 310 through the network 305 or the monitoring application server 360 may relay data received from the monitoring system control unit 310 to the one or more user devices 340, 350 through the network 305. In this regard, the monitoring application server 360 may facilitate communication between the one or more user devices 340, 350 and the monitoring system.

In some implementations, the one or more user devices 340, 350 may be configured to switch whether the one or more user devices 340, 350 communicate with the monitoring system control unit 310 directly (e.g., through link 338) or through the monitoring application server 360 (e.g., through network 305) based on a location of the one or more user devices 340, 350. For instance, when the one or more user devices 340, 350 are located close to the monitoring system control unit 310 and in range to communicate directly with the monitoring system control unit 310, the one or more user devices 340, 350 use direct communication. When the one or more user devices 340, 350 are located far from the monitoring system control unit 310 and not in range to communicate directly with the monitoring system control unit 310, the one or more user devices 340, 350 use communication through the monitoring application server 360.

Although the one or more user devices 340, 350 are shown as being connected to the network 305, in some implementations, the one or more user devices 340, 350 are not connected to the network 305. In these implementations, the one or more user devices 340, 350 communicate directly with one or more of the monitoring system components and no network (e.g., Internet) connection or reliance on remote servers is needed.

In some implementations, the one or more user devices 340, 350 are used in conjunction with only local sensors and/or local devices in a house. In these implementations, the system 100 only includes the one or more user devices 340, 350, the sensors 320, the module 322, the camera 330, and the one or more drone detectors 380. The one or more user devices 340, 350 receive data directly from the sensors 320, the module 322, the camera 330, and the one or more drone detectors 380 and sends data directly to the sensors 320, the module 322, the camera 330, and the one or more drone detectors 380. The one or more user devices 340, 350 provide the appropriate interfaces/processing to provide visual surveillance and reporting.

In other implementations, the system 300 further includes network 305 and the sensors 320, the module 322, the camera 330, and the one or more drone detectors 380 are configured to communicate sensor and image data to the one or more user devices 340, 350 over network 305 (e.g., the Internet, cellular network, etc.). In yet another implementation, the sensors 320, the module 322, the camera 330, and the one or more drone detectors 380 (or a component, such as a bridge/router) are intelligent enough to change the communication pathway from a direct local pathway when the one or more user devices 340, 350 are in close physical proximity to the sensors 320, the module 322, the camera 330, and the one or more drone detectors 380 to a pathway over network 305 when the one or more user devices 340, 350 are farther from the sensors 320, the module 322, the camera 330, and the one or more drone detectors 380. In some examples, the system leverages GPS information from the one or more user devices 340, 350 to determine whether the one or more user devices 340, 350 are close enough to the sensors 320, the module 322, the camera 330, and the one or more drone detectors 380 to use the direct local pathway or whether the one or more user devices 340, 350 are far enough from the sensors 320, the module 322, the camera 330, and the one or more drone detectors 380 that the pathway over network 305 is required. In other examples, the system leverages status communications (e.g., pinging) between the one or more user devices 340, 350 and the sensors 320, the module 322, the camera 330, and the one or more drone detectors 380 to determine whether communication using the direct local pathway is possible. If communication using the direct local pathway is possible, the one or more user devices 340, 350 communicate with the sensors 320, the module 322, the camera 330, and the one or more drone detectors 380 using the direct local pathway. If communication using the direct local pathway is not possible, the one or more user devices 340, 350 communicate with the sensors 320, the module 322, the camera 330, and the one or more drone detectors 380 using the pathway over network 305.

In some implementations, the system 300 provides end users with access to images captured by the camera 330 to aid in decision making. The system 300 may transmit the images captured by the camera 330 over a wireless WAN network to the user devices 340, 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "Away" state, but set not to capture images when the alarm system is armed in a "Stay" state or disarmed. In addition, the camera 330 may be triggered to begin capturing images when the alarm system detects an event, such as an alarm event, a door opening event for a door that leads to an area within a field of view of the camera 330, or motion in the area within the field of view of the camera 330. In other implementations, the camera 330 may capture images continuously, but the captured images may be stored or transmitted over a network when needed.

Further, in some implementations, the system 300 intelligently leverages the one or more drone detectors 380 to aid in security monitoring, property automation, and property management. For example, the one or more drone detectors 380 may aid in investigating alarm events detected at the property by the monitoring system control unit 310. In this example, the monitoring system control unit 310 may detect an alarm event (e.g., a fire alarm, an entry into the property when the system is armed "Stay," etc.) and, based on the detected alarm event, control the one or more drone detectors 380 to attempt to identify drones devices at or near the property at the time of the alarm event. Specifically, the monitoring system control unit 310 may send a control command to each of the one or more drone detectors 380 that causes the one or more drone detectors 380 to perform a coordinated and automated search for drone devices at or near the property. Based on the control command received, each of the one or more drone detectors 380 begins navigating the property and captures images of the property while navigating. Each of the one or more drone detectors 380 may execute a predefined navigation pattern at or near the property or the one or more drone detectors 380 may execute a coordinated scan of the property in which the one or more drone detectors 380 exchange location information and navigate to areas that have not been explored by one of the other devices.

In some examples, the one or more drone detectors 380 may analyze the images captured during the scan of the property for the presence of drone devices in the captured images. For instance, the one or more drone detectors 380 may use image processing techniques in an attempt to identify shapes in the captured images that resemble a drone device. The one or more drone detectors 380 also may analyze the images for moving objects (or use other techniques to identify moving objects) and target imaging on capture of moving objects.

Based on detection of a drone device or another type of moving object, the one or more drone detectors 380 may lock onto the drone device and follow the drone device throughout the property. In this regard, the one or more drone detectors 380 may track the movement of the drone device throughout the property and capture images of the movement. In addition, once one of the one or more drone detectors 380 locks onto a drone device, the one or more drone detectors 380 coordinate to ensure that multiple of the one or more drone detectors 380 do not lock onto the same drone device. The coordination may be direct amongst the one or more drone detectors 380 and/or through the monitoring system control unit 310. The coordination may involve sharing the location of the drone device. Based on the shared location and attributes, the one or more drone detectors 380 may determine whether multiple drone detectors 180 have locked onto the same drone device and take action accordingly.

In some examples, the one or more drone detectors 380 perform image recognition processing on the one or more images in an attempt to detect whether any identified drone devices are legitimate access to the property. In these examples, the one or more drone detectors 380 may have access to access lists of legitimate drone devices (e.g., drone devices provided as part of a security service) that may enter the property and may compare images being captured to the accessed images of legitimate drone devices. Based on the comparison, the one or more drone detectors 380 may determine whether the imaged drone devices match a legitimate drone device of the property. For example, the drone detectors 380 use electronic signature recognition techniques, based on an identified RF signal, to determine whether the imaged drone devices matches a legitimate drone device of the property. The one or more drone detectors 380 then use the determination of whether the imaged drone device matches a legitimate drone device of the property to control further tracking operations.

For example, based on a determination that the imaged drone device is an unauthorized electronic device, the one or more drone detectors 380 may continue tracking the drone device and ensure that images sufficient to identify the drone device have been captured. In this example, the one or more drone detectors 380 may attempt to capture electronic signature data from the unauthorized drone device, such as hardware identifiers, RF signal data, and/or heat signatures of the unauthorized drone device. In addition, the one or more drone detectors 380 may take action to thwart the intrusion by the unauthorized drone device. For example, the one or more drone detectors 380 may transmit a signal to another electronic device at or near the property (e.g., a drone device) to initiate a detection signal of the unauthorized drone device, play loud sounds near the unauthorized drone device, shine lights near the unauthorized drone device, output identifying information collected about the unauthorized drone device (e.g., electronic signatures, captured images, etc.), alert a central station operator or first responder about the intrusion, and may take other actions directed to disrupting the unauthorized drone device.

Alternatively, based on a determination that the imaged drone device is a legitimate drone device, the one or more drone detectors 380 may discontinue tracking the legitimate drone device and scan for unauthorized drone devices. The one or more drone detectors 380 also may report the location of the legitimate drone device. The one or more drone detectors 380 further may continue tracking the legitimate drone device and attempt to provide assistance to the drone device. For instance, if the alarm is a fire alarm event, the one or more drone detectors 380 may continuously or periodically update the location of the legitimate drone device to assist another drone devices or first responders in assisting the legitimate drone device, provide audible reminders of what types of actions should be taken in a fire, enable a central station operator or first responder to talk to the legitimate user through a two-way voice communication session established through the monitoring system control unit 310 and the drone device.

In some examples, the one or more drone detectors 380 may be assigned to different areas of the property where the one or more drone detectors 380 can monitor airspace in an unobstructed manner. In these examples, the one or more drone detectors 380 may be assigned to different levels in a property (e.g., a front entrance drone detector and a back entrance drone detector) and even different rooms or sections that are potentially blocked by doors. The monitoring system control unit 310 coordinates tracking based on the assigned areas. For instance, the monitoring system control unit 310 determines areas in or near a property where an event has been detected (e.g., where motion is sensed, where a door or window is opened, etc.) and only controls the devices assigned to the determined areas to operate. In this regard, the monitoring system control unit 310 may use location of users determined using sensors to control operation of the one or more drone detectors 380.

In some implementations, after detecting a drone device at or near the property, the one or more drone detectors 380 may actively impede the operation of the drone device at or near the property. For example, in some instances, in response to detecting the drone device, the one or more drone detectors 380 may enable a RF jamming signal, generate a laser or light signal to impede the detected drone device from navigating at or near the property, generate a blinding light to reduce visibility of the property, or enable an alarm signal to prevent further trespass. In other examples, the one or more drone detectors 380 may transmit signals to the monitor control unit 310 to enable particular actions at or near the property (e.g., lower the shades, close garage door, lock doors, etc.).

Figure 4:
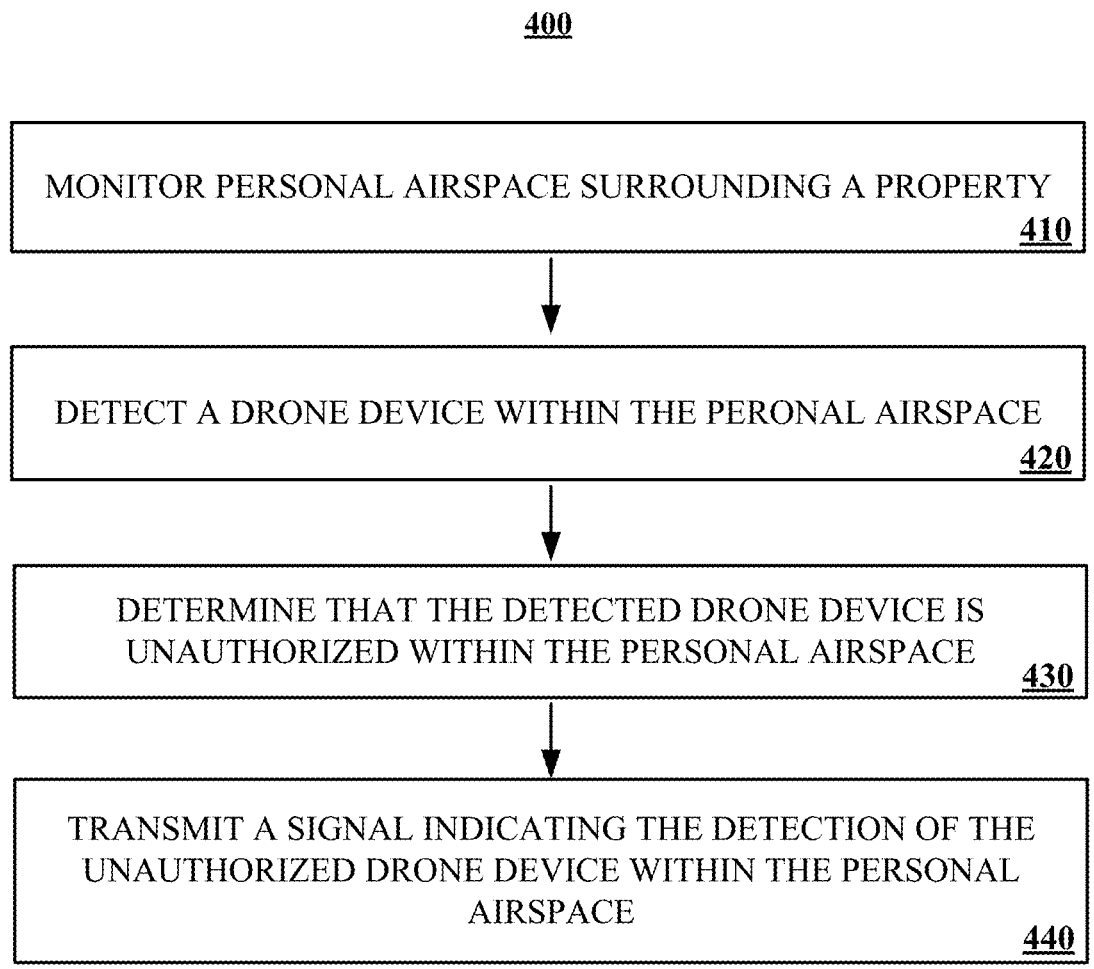
FIG. 4 is a flowchart of an example of a process for detecting the presence of an unauthorized drone device within an airspace near a property.

FIG. 4 illustrates an example process 400 for detecting the presence of an unauthorized drone device within an airspace near a property. Briefly, the process 400 may include monitoring personal airspace surrounding a property (410), detecting a drone device within the personal airspace (420), determining that the detected drone device is unauthorized to be located within the personal airspace (430), and transmitting a signal indicating the detection of the unauthorized drone device within the personal airspace (440).

In more detail, the process 400 may include monitoring personal airspace surrounding a property (410). For example, the one or more drone detectors 380 may monitor personal airspace surrounding a property where the electronic system 300 is located. The one or more drone detectors 380 may be configured to capture sensor data from the personal airspace surrounding the property and monitor the captured sensor data for activity. For instance, the one or more drone detectors 380 may monitor particular frequency ranges that correspond to electronic signals generated by drone devices. In other instances, the one or more drone detectors 380 may monitor other types of signals such, for example, RF signals, video signals, audio signals, or thermal signatures that may be generated by drone devices.

The process 400 may include detecting a drone device within the personal airspace (420). For example, the one or more drone detectors 380 may detect the presence of a drone device within the airspace of the property. For instance, as discussed previously with respect to FIG. 3, the one or more drone detectors 380 may detect various types of signals that are generated from the operation of a drone device such as, for example, audio signals from drone device propellers, video signals of nearby airspace, thermal signals generated from the drone devices, radar detection of aerial speed of drone devices, or radiofrequency (RF) detection of oscillation in electronic circuits of drone devices. For instance, the one or more drone detectors 380 may analyze sound input for harmonics produced by drone devices for detection, and in response to detecting the drone devices, exchange communications with the sensors 320. For example, the one or more drone detectors 380 may detect sound generated by a nearby drone device and confirm the detection by accessing video or image data from to a security camera at or near the property. In other example, the one or more drone detectors 380 may monitor a Bluetooth signal of a drone device at or near the property and in response to detecting the drone device, exchange communications with the sensors 320.

The process 400 may include determining that the detected drone device is unauthorized within the personal airspace (430). For example, the one or more drone detectors 380 may determine that the detected drone device is an unauthorized drone device based on determining the signal from the drone device indicates that the drone device does not have the authority to enter the airspace of the property.

In some instances, the one or more drone detectors 380 may generate a signature for the detected drone device based on the signals collected by the one or more drone detectors 380. The signature for the detected drone device may then be compared against a repository of authorized devices that includes an access control list for various electronic devices that have been authorized by the property owner to enter the airspace of the property. For example, the repository of authorized devices may include signatures associated with drone devices that are owned by the property owner, drone devices that are provided as part of a security service by a security provider, and/or associated drone devices that have previously entered the airspace of the property. In such instances, the one or more drone detectors 380 may compare the signature of the detected drone device to signatures included in the repository of authorized devices, and, in response to determining that the signature is not included in the repository of authorized devices, determine that the detected drone device is an unauthorized drone device.

In some implementations, determining whether a detected drone is an authorized or unauthorized drone may include evaluating a set of one or more permissions associated with an access control list. The access control list associated with a drone may indicate that a drone has a limited type of access to the property. For example, a drone may be authorized during a first part of a day (e.g., nighttime) but not during a second part of the day (e.g., daytime). Alternatively, or in addition, for example, a drone may be authorized to fly over the property from above a predetermined altitude. However, if the drone flies lower than the predetermined altitude, the drone becomes unauthorized. Accordingly, though some implementations merely determine whether a detected drone is authorized or unauthorized based on whether the detected drone's signature is in a database of authorized drones, other implementations determine whether a drone is authorized differently (e.g., by analyzing the drone's actions in view of a drone access control list).

The process 400 may include transmitting a signal indicating the detection of the unauthorized drone device within the personal airspace (440). For example, in response to the one or more drone detectors 380 detecting an unauthorized drone device, the one or more drone detectors 380 may transmit a signal to either the user devices 340, 350, monitor control unit 310, the monitoring application server 360, or the central alarm station server 370. For instance, the one or more drone detectors 380 may initially determine the security threat posed by the detected unauthorized drone device, and transmit the signal accordingly. For example, if there is a high security threat posed by the detected unauthorized device, then the one or more drone detectors 380 may transmit the signal to the central alarm station server 370. In another example, if there is a low security threat posed by the detected unauthorized device, then the one or more drone detectors 180 may transmit the signal to the user devices 340, 350.

In other instances, the one or more drone detectors 380 may transmit the signal to both the user devices 340, 350 and the central alarm station server 370. For example, the signal may include a text notification to the user devices 340, 350 or the central alarm station server 370 that includes information such as device type, time of detection, or other types of identifying information associated with the detected unauthorized device. In some instances, the notification may additionally or alternatively include information related to the severity of the security breach posed by the unauthorized device so that a property user may take action in response to receiving the notification on the user devices 340, 350. For example, the user may receive options to contact a security provider, enable particular features of the system 300 such as enabling the sensors 320 to collect footage, close the windows or lock the front door. In other examples, the user may receive options to contact local law enforcement agencies to report a potential trespass by the detected unauthorized device.

Figure 5:
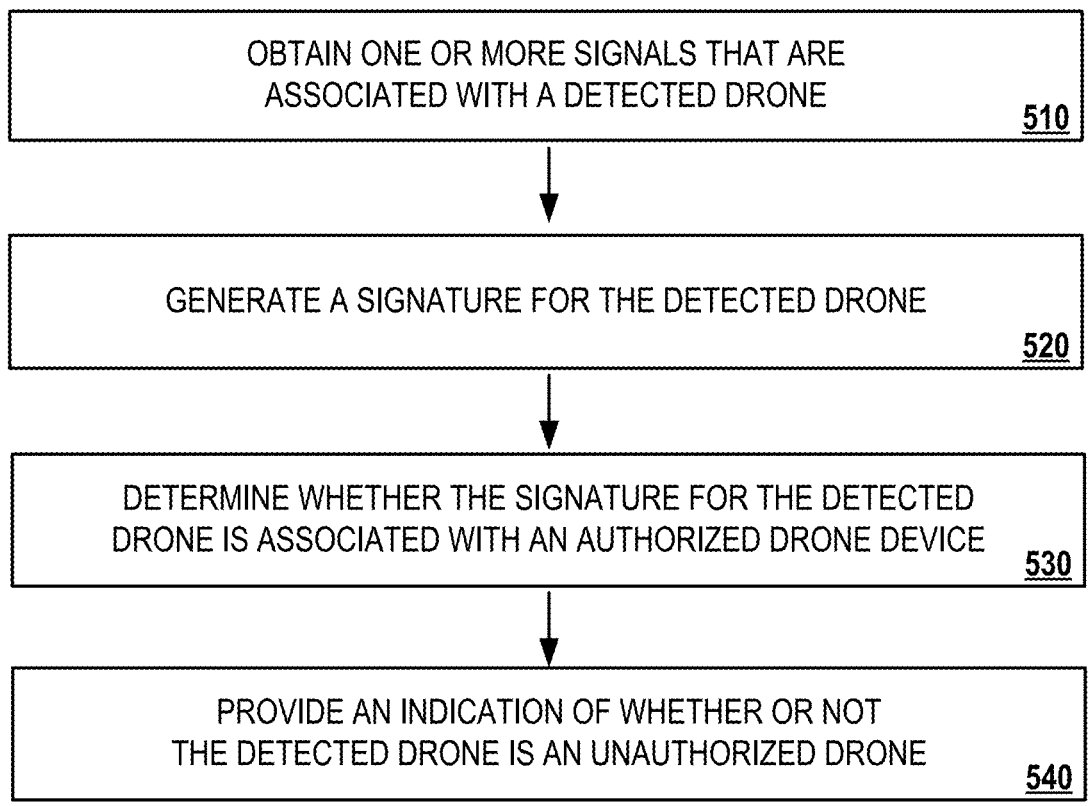
FIG. 5 is a flowchart of an example of a process for determining whether a detected drone is an unauthorized drone.

FIG. 5 is a flowchart of an example of a process 500 for determining whether a detected drone is an unauthorized drone. Briefly, the process 500 may include obtaining one or more signals that are associated with a drone (510), generating a signature for the detected drone (520), determining whether the signature for the detected drone is included in a repository of authorized drone devices (530), and providing an indication of whether or not the detected drone is an unauthorized drone (540).

The process 500 begins by obtaining 510 one or more signals that are associated with a drone that is detected within a predetermined geographic area that surrounds a property. In one implementation, the property may include a house, building, or other structure. The predetermined geographic area that surrounds the property may include, for example, a geographic area that spans a predetermined threshold distance from the property. The predetermined threshold distance may be based on a set of one or more boundary lines such as, for example, the boundary lines established by a land deed associated with the property. Alternatively, the predetermined threshold distance may include for example, a particular distance that extends from one or more portions of the property in multiple directions (including skyward). For instance, the predetermined threshold distance may be a predetermined 5 meters, 10 meters, 15 meters, or the like from each portion of the property (including skyward). One or more different types of signals that are associated with the drone that is detected within a predetermined geographic region that surrounds a property may be obtained at stage 510. For example, the obtained signals may include audio signals from drone device propellers, video signals of nearby airspace, image signals of nearby airspace, thermal signals generated from the drone device, radar detection of aerial speed of the drone device, radiofrequency detection of oscillation in electronic circuits of the drone device, RF communications to and from the drone device, or the like.

The process may continue by generating 520 a signature for the drone that was detected within a predetermined geographic area that surrounds a property. The signature may be based on a representation of the one or more obtained signals that are associated with the detected drone. In one implementation, a particular signal of the one or more signals may be used to generate a signature for the drone that was detected within a predetermined geographic area that surrounds the property. Alternatively, a collection of two or more signals may be used to generate a signature for the drone that was detected within a predetermined geographic area that surrounds the property. The one or more signals may include, for example, one or more of the signals obtained in stage 510. The generated signature that is based on the one or more signals that are associated with the detected drone may function as a unique identifier that distinguishes the detected drone device from other drone devices.

The process may continue by determining 530 whether the generated signature for the drone device that was detected within the predetermined geographic area that surrounds the property is associated with an authorized drone device. Determining whether the generated signature for the detected drone device is associated with an authorized drone device may include, for example, accessing a database of authorized drone device signatures. The database of authorized drone device signatures may be maintained by a legitimate occupant of the property, a security services provider, law enforcement, or the like using one or more computers and may include a signature for each drone that is authorized to enter the predetermined geographic area that surrounds the property. A search of the database of authorized drone device signatures may be performed based on the generated drone device signature. If it is determined that the generated signature of the drone device is included in the database of authorized drone device signatures, then it may be determined that the detected drone that is associated with the generated signature is an authorized drone. In such instances, the security monitoring system may take no further action regarding surveillance of the drone. Alternatively, if it is determined that the generated signature of the drone device is not included in the database of authorized drone device signatures, then it may be determined that the detected drone that is associated with the generated signature is an unauthorized drone. In some implementations, a determination of whether or not a drone device is authorized may include evaluating the drone's actions in view of one or more permissions in the drone's access control list (which may be stored in the database of authorized drone device signatures, or a different database).

The process may continue by providing 540 an indication as to whether or not the drone that was detected within a predetermined geographic area of the property is an unauthorized drone device. For example, if it is determined that the generated signature that is associated with the detected drone is not in the database of authorized drones, then an instruction may be generated that instructs the drone detector that detected the unauthorized drone to transmit a signal to a user device, monitor control unit, a central alarm station server, or the like indicating that an unauthorized drone has been detected within a predetermined geographic area of the property. Alternatively, if it is determined that the generated signature that is associated with the detected drone is in the database of authorized drones, then an instruction may be generated that instructs the drone detector that detected the authorized drone that a communication to a user device, monitor control unit, central alarm station or the like is discretionary, since the detected drone is an authorized drone. However, in some implementations, a drone detection device may still transmit a notification to a user device, monitor control unit, central alarm station server, or the like that alerts the user device, monitor control unit, central alarm station server, or the like to the presence of authorized drones. For instance, a user device, monitor control unit, central alarm stations server, or the like may maintain a map includes data points that represent each of the drones that are detected within a predetermined geographic distance of a property regardless of whether the detected drones are authorized or unauthorized.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A device, comprising:
   a network interface;
   one or more sensors;
   one or more processors; and
   one or more storage devices that include instructions that are operable, when executed by the one or more processors, to cause the one or more processors to perform operations comprising:
   monitoring a predetermined geographic area that surrounds a property;
   detecting, using the one or more sensors, a presence of a drone device that is within the predetermined geographic area that surrounds the property;
   determining whether the detected drone device is an unauthorized drone device comprising:
   accessing a set of stored permissions defining drone device access to the property, wherein the permissions define (i) one or more authorized drone device actions related to the property and (ii) one or more unauthorized drone device actions related to the property;
   responsive to determining, based on sensor data generated by the one or more sensors, that at least one action of the detected drone device includes at least one of the one or more unauthorized drone actions defined by the set of stored permissions, determining that the detected drone device is an unauthorized drone device;
   in response to determining that the detected drone device is an unauthorized drone device, transmitting an instruction to deploy an authorized drone device to engage the detected drone device;
   receiving, from the authorized drone device, data indicating that (i) the detected drone device is determined to be a security threat to the property based on engaging the detected drone device, and (ii) an instruction to perform an adjustment to a present configuration of one or more fixtures of the property, wherein the adjustment to the present configuration of the one or more fixtures is determined by the authorized drone device in response to the detected drone device being determined to be the security threat to the property; and
   performing the adjustment to the present configuration of the one or more fixtures.

2. The device of claim 1, wherein the predetermined geographic area that surrounds the property comprises airspace that surrounds the property.

3. The device of claim 1, wherein monitoring the predetermined geographic area that surrounds the property comprises:
   capturing sensor data that is output from at least one of the one or more sensors.

4. The device of claim 1, wherein detecting the presence of the drone device that is within the predetermined geographic area that surrounds the property comprises:
   determining, based on detection of sensor data generated by the one or more sensors, that the drone device is within the predetermined geographic area that surrounds the property, wherein the sensor data includes (i) audio signals from a propeller of the drone device, (ii) video signals of airspace near the drone device, (iii) thermal signals generated from the drone device, (iv) radar detection of aerial speed of the drone device, (v) radiofrequency (RF) detection of oscillation in electronic circuits of the drone device, or (vi) RF communications.

5. The device of claim 4, wherein detecting the presence of the drone device that is within the predetermined geographic area that surrounds the property further comprises:
confirming, based on the processing of second data associated with the property, that the drone device exists within the predetermined geographic area that surrounds the property.

6. The device of claim 5, wherein the second data comprises video or image data captured by a security camera that is located within a predetermined distance from the property.

7. The method of claim 1, wherein the adjustment to the present configuration of the one or more fixtures comprises:
lowering one or more window shades;
turning on one or more lights;
locking one or more windows; and
activating one or more holograms.

8. A device, comprising:
a network interface;
one or more sensors;
one or more processors; and
one or more storage devices that include instructions that are operable, when executed by the one or more processors, to cause the one or more processors to perform operations comprising:
monitoring a predetermined geographic area that surrounds a property;
detecting, using the one or more sensors, the presence of a drone device that is within the predetermined geographic area that surrounds the property;
determining whether the detected drone device is an unauthorized drone device including:
generating an electronic signature that is associated with the detected drone device comprising:
obtaining, using the one or more sensors, two or more sensor signals that include at least two of (i) audio signals from a propeller of the detected drone device, (ii) video signals of airspace near the detected drone device, (iii) thermal signals generated from the detected drone device, (iv) radar detection of aerial speed of the detected drone device, (v) radiofrequency (RF) detection of oscillation in electronic circuits of the detected drone device, or (vi) RF communications;
generating the electronic signature for the detected drone device based on the obtained two or more sensor signals; and
determining, based on the generated electronic signature, that the drone device is an unauthorized drone device; and
in response to determining that the detected drone device is an unauthorized drone device, transmitting an instruction to deploy an authorized drone device to engage the detected drone device;
receiving, from the authorized drone device, data indicating that (i) the detected drone device is determined to be a security threat to the property based on engaging the detected drone device, and (ii) an instruction to perform an adjustment to a present configuration of one or more fixtures of the property, wherein the adjustment to the present configuration of the one or more fixtures is determined by the authorized drone device in response to the detected drone device being determined to be the security threat to the property; and
performing the adjustment to the present configuration of the one or more fixtures.

9. The device of claim 8, wherein determining, based on the generated electronic signature, that the detected drone device is an unauthorized drone device comprises:
accessing a database storing one or more electronic signatures that are each associated with a respective authorized drone device; and
determining whether the generated electronic signature that is associated with the detected drone device is included in the database.

10. The device of claim 9, the operations further comprising:
determining that the detected drone device is an unauthorized drone device when the generated electronic signature is not included in the database.

11. The device of claim 9, the operations further comprising:
determining that the detected drone device is an authorized drone device when the generated electronic signature is included in the database.

12. The device of claim 8, the operations further comprising:
transmitting a notification to a user device, a central alarm station, or a combination thereof, that alerts the user device, or the central alarm station server of the presence of the unauthorized drone device within the predetermined geographic area that surrounds the property.

13. The device of claim 12, wherein the notification comprises information that identifies the detected drone device.

14. The device of claim 13, wherein the information that identifies the detected drone device comprises a drone device type, a time of detection of the detected drone device, or both.

15. The device of claim 12, the operations further comprising:
determining whether the security threat posed by the detected drone device exceeds a predetermined threshold.

16. The device of claim 15, the operations further comprising:
in response to determining that the security threat posed by the detected drone device exceeds the predetermined threshold, transmitting a second notification to the central alarm station server.

17. The device of claim 15, the operations further comprising:
in response to determining that the security threat posed by the detected drone device does not exceed the predetermined threshold, transmitting a second notification to the user device.

18. The device of claim 8, wherein the adjustment to the present configuration of the one or more fixtures comprises lowering one or more shades, turning on one or more lights, turning off one or more lights, closing one or more garage doors, or locking one or more doors.

* * * * *